United States Patent [19]

Yuki

[11] Patent Number: 5,706,370
[45] Date of Patent: Jan. 6, 1998

[54] OPTICAL DEFLECTION SCANNING DEVICE

[75] Inventor: Hiroshi Yuki, Shiga-Ken, Japan

[73] Assignee: Minolta Co., Ltd., Osaka, Japan

[21] Appl. No.: 580,293

[22] Filed: Dec. 28, 1995

[30] Foreign Application Priority Data

Dec. 28, 1994 [JP] Japan ................... 6-328798

[51] Int. Cl.[6] ................................. G02F 1/335
[52] U.S. Cl. .................. 385/7; 385/4; 385/10; 385/14; 385/39; 385/129; 385/130
[58] Field of Search ................ 385/4, 7, 8, 10, 385/39, 40, 38, 129, 130, 131, 14

[56] References Cited

U.S. PATENT DOCUMENTS

| | | | |
|---|---|---|---|
| 4,735,476 | 4/1988 | Heffner et al. | 385/7 X |
| 4,973,121 | 11/1990 | Brophy et al. | 385/10 X |
| 5,150,437 | 9/1992 | Gfeller | 385/7 |
| 5,157,543 | 10/1992 | Fukuzawa et al. | 385/10 X |
| 5,329,397 | 7/1994 | Chang | 385/7 X |

OTHER PUBLICATIONS

Tsai, Chen S., "Guided–Wave Acoustooptic Bragg Modulators for Wide–Band Integrated Optic Communications and Signal Processing", IEEE Transactions on Circuits and Systems, vol. CAS–26, No. 12, pp. 1072–1098, Dec. 1979.

*Primary Examiner*—Brian Healy
*Attorney, Agent, or Firm*—Burns, Doane, Swecker & Mathis, LLP

[57] ABSTRACT

An optical deflection scanning device has a transducer, a waveguide medium for unidirectionally propagating an elastic wave based on the oscillation of the transducer. The light emitted from a light source is incident to the waveguide medium in a direction opposite the group velocity of the elastic wave in the waveguide medium. The incident light and elastic wave interact, and the incident light is deflected within the same plane as the waveguide medium in conjunction with elastic wave travel.

23 Claims, 3 Drawing Sheets

OPTICAL DEFLECTION SCANNING DEVICE

BACKGROUND OF THE INVENTION

1. Field of the Invention

The present invention relates to an optical deflection scanning device, and specifically relates to an optical deflection scanning device using optical deflection elements having acousto-optic effects.

2. Description of the Related Art

Various types of optical deflection scanning systems having optical deflection elements which use acousto-optic effects have been proposed.

For example, there is a well-known optical deflection scanning device which utilizes incident light which interacts, through diffraction, at an angle of 90° relative to the direction of travel of a surface elastic, e.g. acoustic, wave. This device uses Bragg diffraction, and has a relatively narrow scanning range since the deflection angle is about 10°. Thus, it is difficult to use such a device as an image writing head for laser printers which require scanning of long lines.

Another well-known device utilizes the interaction, i.e. diffraction, of incident light and an elastic wave on the same line. In this device, diffracted light travels in an inclined direction relative to the waveguide plane. When diffracted light travels in an inclined direction relative to the waveguide plane, however, the diffracted light is difficult to regulate because it passes within the substrate supporting the waveguide.

SUMMARY OF THE INVENTION

A main object of the present invention is to provide an optical deflection scanning device having a broad scanning range.

Another object of the present invention is to provide an optical deflection scanning device which easily regulates diffracted light.

The aforesaid objects of the invention are achieved by providing an optical deflection scanning device comprising a transducer, a waveguide medium for propagating an elastic wave unidirectionally based on the oscillation of the transducer, and light incidence means for allowing light to enter from a direction relative to the group velocity of the elastic wave in the waveguide medium, wherein the incident light and the elastic wave interact, and the incident light is deflected within the same plane as the waveguide medium in conjunction with elastic wave travel.

A bulk wave, or surface elastic wave (Rayleigh wave, leaky wave, Sezawa wave and the like), may be used as the elastic wave.

If a wave having a power flow angle is used as the elastic wave, incident light is diffracted at an angle proportional to the power flow angle to accomplish deflection scanning parallel to the waveguide plane. Furthermore, when light is incident opposite the direction of travel of an elastic wave traveling from one side surface of a waveguide, the incident light is diffracted inward into the waveguide medium, so as to be deflected in a direction parallel to the waveguide plane. The scanning range is substantially as long as the waveguide.

These and other objects, features, aspects and advantages of the present invention will be apparent from the following detailed description of the invention when taken in conjunction with the accompanying drawings.

DESCRIPTION OF THE PREFERRED EMBODIMENTS

Embodiments of the optical deflection scanning device of the present invention are described hereinafter with reference to the accompanying drawings.

First Embodiment

Figure 1:
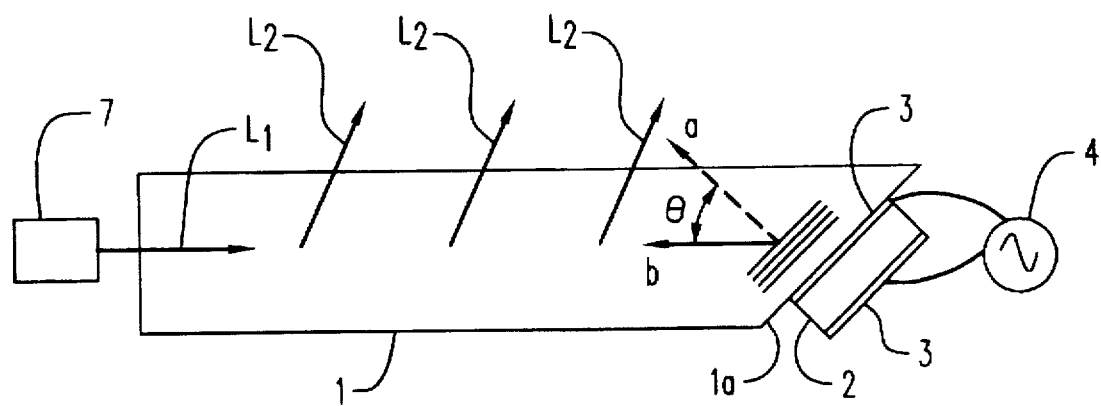
FIG. 1 is a top view showing a first embodiment of the present invention.

A first embodiment of the invention is shown in FIG. 1. The first embodiment uses a crystal substrate 1 comprising a single crystal $TeO_2$ as a waveguide medium. A transducer 2 is mounted on a cut surface 1a which is cut at an angle from the crystal axis. Transducer 2 is provided with electrodes 3 on both side of a piezoelectric member, and oscillates at a predetermined frequency when a voltage is applied to the electrodes 3 from a high-frequency power source 4. A bulk wave is generated within the crystal substrate 1 in accordance with the oscillation of transducer 2. The bulk wave has a phase velocity direction indicated by arrow "a", and a group velocity direction indicated by arrow "b". Angle θ is the power flow angle. The bulk wave energy travels in the group velocity direction "b", i.e., the length direction of crystal substrate 1.

On the other hand, light L1 of a predetermined frequency emitted from light incidence means 7 including a light source is incident through an edge surface of crystal substrate 1 in a direction opposite the group velocity direction "b" of the bulk wave. This incident light L1 interacts with the bulk wave and is deflected as diffraction light L2. Diffraction light L2 is deflected in a direction parallel to the plane of the crystal substrate 1 in conjunction with the advance of the bulk wave, and scans a straight line on the surface of a photosensitive member, not shown in the drawing. Thus, an image (electrostatic latent image) is formed line by line on the surface of the photosensitive member by modulating the incident light L1 based on image information. The scanning region is equal to the entire length of crystal substrate 1, thereby allowing scanning of long lines.

The angle of deflection of diffraction light L2 is proportional to the power flow angle θ. Accordingly, the angle of deflection becomes larger as the power flow angle θ becomes larger, thereby allowing easy regulation of diffraction light L2. For example, diffraction light L2 can be easily focused if crystal substrate 1 is provided with a diffraction grating lens. The power flow angle θ is determined by the direction of the cut relative to the crystal axis, e.g., the cut may be made in a direction which increases the power flow angle θ from a crystal axis (100) or (110) of a single crystal $TeO_2$.

A single crystal $Li_2B_4O_7$, single crystal $LiTa_2O_5$, single crystal $LiNbO_3$ and the like alternatively may be used for the aforesaid single crystal $TeO_2$ as the material of the crystal substrate 1, in so far as any of these crystals are cut in a direction which increases the power flow angle θ.

Figure 2:
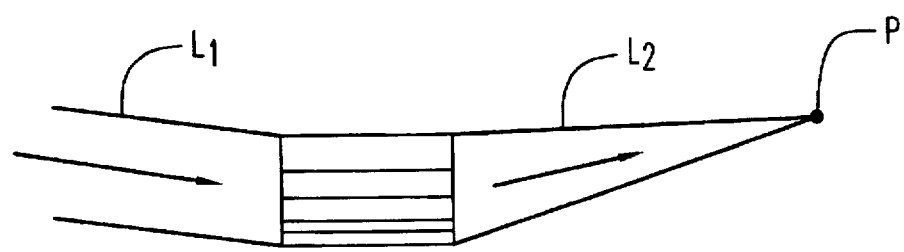
FIG. 2 shows the focus state utilizing a chirp wave.

On the other hand, a chirp wave may be used instead of the aforesaid bulk wave. As shown in FIG. 2, use of a chirp wave allows use of a lens effect which changes the angle of diffraction of the light by the pulse position, so as to focus diffraction light L2 at point P. Accordingly, a collecting lens is not required.

Second Embodiment

Figure 3:
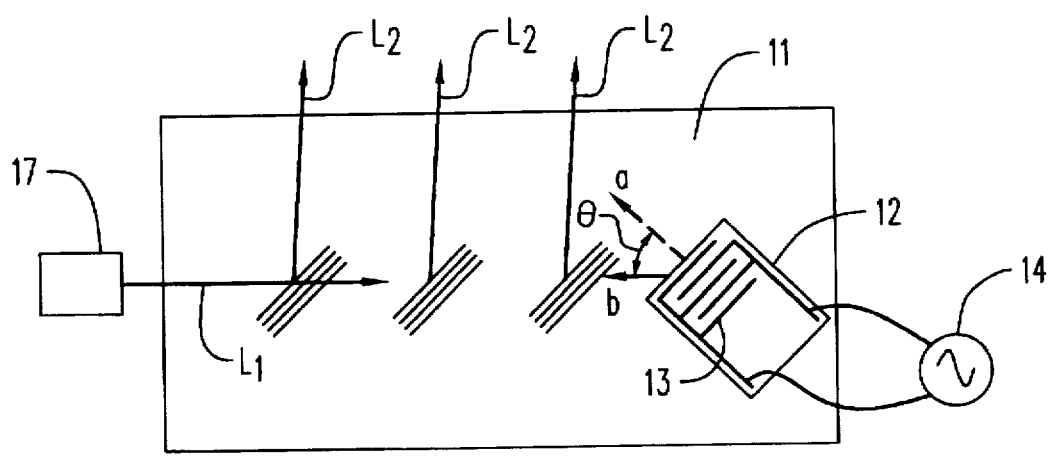
FIG. 3 is a top view of a second embodiment of the invention.
Figure 4:
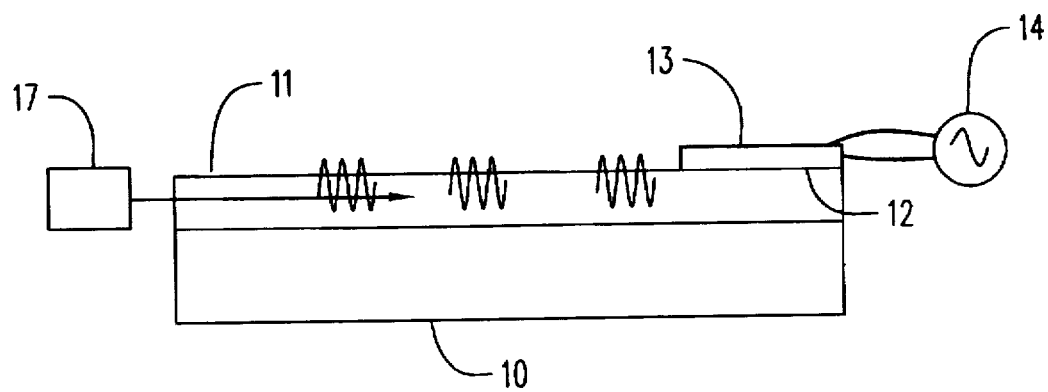
FIG. 4 is a section view of the second embodiment of the present invention.

The second embodiment is shown in FIGS. 3 and 4. The second embodiment is provided with a waveguide 11 formed on a base substrate 10, and a transducer 12 having an interdigital electrode 13. A surface elastic wave of predetermined frequency is generated within waveguide 11 by the oscillation of transducer 12 induced by a high-frequency power source 14. This surface elastic wave has a phase velocity in direction "a", group velocity in direction "b", and power flow angle θ.

Light L1 of a predetermined frequency is emitted by light incidence means 17 including a light source and is incident to waveguide 11 in a direction opposite to the surface elastic wave group velocity direction "b". Just as previously described in the first embodiment, this incident light L1 is deflected as diffraction light L2, and scans a straight line on the surface of a photosensitive member, not shown in the drawings. The scanning region may be equal to the total length of the waveguide 11, thereby allowing scanning of long lines. Diffraction light L2 is readily regulated because it is deflected in a direction parallel to the plane of waveguide 11 when emitted from the waveguide 11.

$Li_2B_4O_7$, $LiTa_2O_5$, $LiNbO_3$ and the like are materials usable for waveguide 11. These materials may be formed in a film on substrate 10 in a direction increasing power flow angle θ by means such as laser ablation, ECR spattering, RF magnetron spattering and the like. Furthermore, a Rayleigh wave, leaky wave, Sezawa wave and the like may be use as the surface elastic wave. If a chirp wave is used as the surface elastic wave, the diffraction light L2 can be focused as shown in FIG. 2.

For example, diffraction light having a secondary angle of diffraction of 40.2° can be obtained when waveguide 11 is constructed of a film of $Li_2B_4O_7$, a leaky surface elastic wave has a wavelength of 1.3 μm, the power flow angle is 49.8°, with an input high frequency up to 2 GHz, and acoustic speed of 3,700 m/sec.

Third Embodiment

Figure 5:
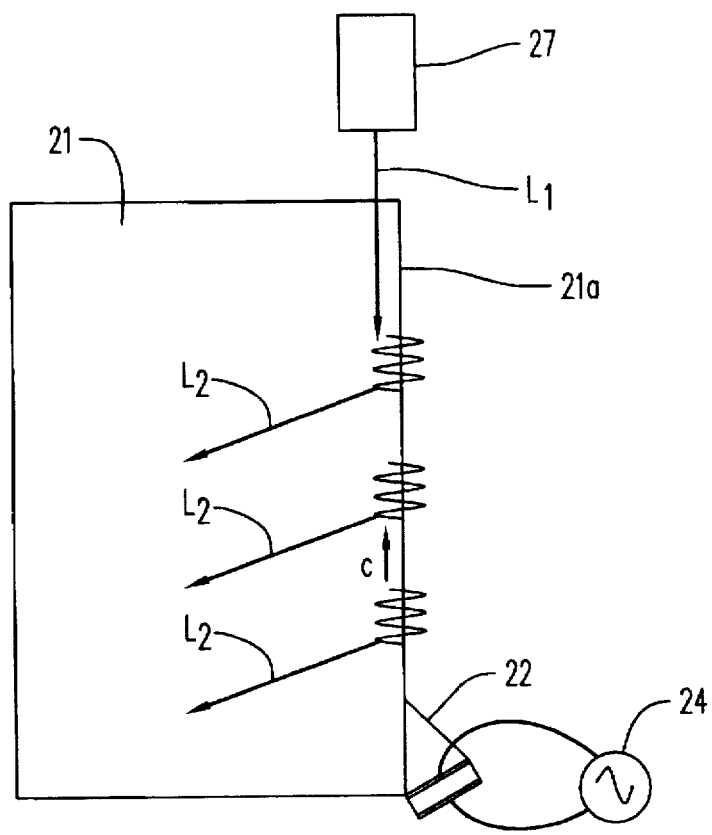
FIG. 5 is a top view of a third embodiment of the invention.
Figure 6:
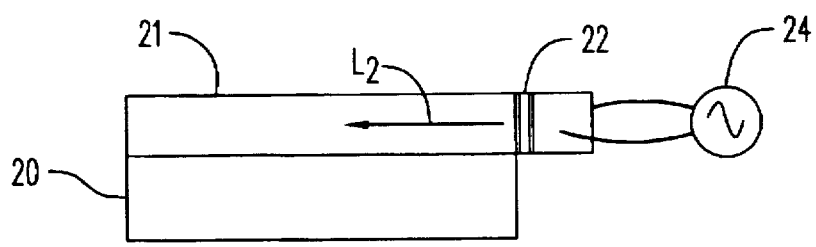
FIG. 6 is a section view of the third embodiment of the invention.

The third embodiment is shown in FIGS. 5 and 6. The third embodiment provides a waveguide film 21 formed on a substrate 20, and a wedge type transducer 22 arranged on one side surface 21a of waveguide 21. A surface elastic wave of predetermined frequency is generated at side surface 21a of waveguide 21 by the oscillation of transducer 22 via a high-frequency power source 24. This surface elastic wave travels in the same direction (direction "c") as the phase velocity direction and group velocity direction.

On the other hand, light L1 of a predetermined frequency is emitted from light incidence means 27 containing a light source and is incident to waveguide 21 in a direction opposite the direction of travel of the surface elastic wave. Light diffraction normally tends toward the smaller side of the difference in refractive indices. In the third embodiment, a diffraction grating may be provided at side surface 21a of waveguide 21, whereby diffraction light L2 is deflected into waveguide 21 because the difference in refractive indices of side surface 21a and waveguide 21 is smaller than the difference in refractive indices of waveguide 21 and air. The scanning region of diffraction light L2 is equal to the total length of waveguide 21 just as previously described in the first and second embodiments. Diffraction light L2 is easily regulated because it is deflected parallel to the plane of waveguide 21 when emitted from the waveguide 21.

The various types of surface elastic waves and materials of waveguide 21 are identical to those of the second embodiment. If the surface elastic wave is a chirp wave, diffraction light may be focused without using a lens just as previously described in the second embodiment.

Other Embodiments

The optical deflection scanning device of the present invention is not limited to the previously described embodiments, and may be variously modified insofar as such modifications do not depart essentially from the scope of the invention.

The device of the present invention can be widely used for image writing to an electrophotographic photosensitive member, silver halide film, for an image reader light source, and for image projection to a display device.

As can be readily understood from the preceding description, the present invention allows scanning of a length commensurate with the total length of a waveguide medium over a large scanning region because incident light interacts with an elastic wave in relative directions within said waveguide medium, whereby the incident light is deflected within the same plane as the waveguide medium in conjunction with the travel of the elastic wave. Furthermore, incident light is diffracted into the waveguide medium and emitted from the waveguide medium, thereby allowing easy regulation of the diffraction light (emitted light). The device of the present invention provides excellent reliability and silence compared to mechanical optical deflection means such as a polygonal mirror and the like.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An optical deflection scanning device comprising:
   a transducer;
   a waveguide medium that defines a planar path for unidirectionally propagating an elastic wave produced by oscillation of said transducer, said elastic wave having a group velocity direction of travel along said path and a phase velocity direction which is different from said group velocity direction; and
   light incidence means for causing incident light to enter said waveguide medium from a direction opposite the group velocity direction of the elastic wave in said waveguide medium,
   wherein said incident light is deflected within said planar path as diffraction light at every position where said incident light and said elastic wave interact, such that said diffraction light is scanned along said path in conjunction with elastic wave travel.

2. An optical deflection scanning device according to claim 1, wherein said waveguide medium is a crystal substrate.

3. An optical deflection scanning device according to claim 2, wherein the crystal substrate comprises a single crystal.

4. An optical deflection scanning device according to claim 2, wherein said transducer is mounted on a cut surface of the crystal substrate which is cut at an angle from the crystal axis.

5. An optical deflection scanning device according to claim 1, wherein said transducer generates a chirp wave.

6. An optical deflection scanning device according to claim 1, wherein said waveguide medium is formed on a base substrate.

7. An optical deflection scanning device according to claim 6, wherein said transducer has an interdigital electrode.

8. An optical deflection scanning device according to claim 1, wherein said transducer is arranged on one side of said waveguide medium.

9. An optical deflection scanning device according to claim 8, wherein said transducer is wedge shaped.

10. An optical deflection scanning device comprising:

a waveguide medium that defines a planar path for the propagation of elastic wave energy;

a transducer for generating an elastic wave within said waveguide medium, said elastic wave having a group velocity direction of travel along said path and a phase velocity direction which is different from said group direction; and a light source, wherein the light emitted from said light source is incident to said waveguide medium, and is deflected within the planar path defined by said waveguide medium as diffraction light at every position where said light and said elastic wave interact, such that said diffraction light is scanned.

11. An optical deflection scanning device according to claim 10, wherein said waveguide medium is a crystal substrate.

12. An optical deflection scanning device according to claim 11, wherein the crystal substrate comprises a single crystal.

13. An optical deflection scanning device according to claim 11, wherein said transducer is mounted on a cut surface of the crystal substrate which is cut at an angle from the crystal axis.

14. An optical deflection scanning device according to claim 10, wherein said transducer generates a chirp wave.

15. An optical deflection scanning device according to claim 10, wherein said waveguide medium is formed on a base substrate.

16. An optical deflection scanning device according to claim 15, wherein said transducer has an interdigital electrode.

17. An optical deflection scanning device according to claim 10, wherein said transducer is arranged on one side of said waveguide medium.

18. An optical deflection scanning device according to claim 17, wherein said transducer is wedge shaped.

19. An optical deflection scanning device according to claim 1, wherein the incident light has a predetermined frequency.

20. An optical deflection scanning device according to claim 10, wherein light emitted from said light source has a predetermined frequency.

21. An optical deflection scanning device according to claim 1, wherein the position where said incident light and said elastic wave interact moves along said planar path in the direction of advance of said elastic wave.

22. An optical deflection scanning device according to claim 10, wherein the position where said light and said elastic wave interact moves along said planar path in the direction of advance of said elastic wave.

23. An optical deflection scanning device comprising:

a single crystal substrate that defines a planar path for the propagation of elastic wave energy;

a transducer for generating an elastic wave within said single crystal substrate, said elastic wave having a group velocity direction of travel along said path; and a light source for emitting light having a predetermined frequency, wherein the light emitted from said light source is incident to said single crystal substrate and deflected as diffraction light at every position where said light and said elastic wave traveling in the group velocity direction interact within the planar path defined by said single crystal substrate, such that said diffraction light emerges on the exterior of said substrate in a manner so as to be swept, to thereby perform a scanning operation.

* * * * *